United States Patent [19]
Paynter et al.

[11] Patent Number: 5,518,951
[45] Date of Patent: May 21, 1996

[54] METHOD FOR MAKING THIN FILM PIEZORESISTIVE SENSOR

[75] Inventors: Bruce Paynter, Irvine; Henry J. McCarrick, Huntington Beach; Joseph W. Adamic, Jr., Fountain Valley, all of Calif.

[73] Assignee: Span Instruments, Inc., Plano, Tex.

[21] Appl. No.: 427,846

[22] Filed: Apr. 26, 1995

Related U.S. Application Data

[62] Division of Ser. No. 236,653, Apr. 29, 1994, abandoned, which is a continuation of Ser. No. 749,933, Aug. 26, 1991, abandoned.

[51] Int. Cl.⁶ .................................................. H01L 21/302
[52] U.S. Cl. .......................... 437/79; 437/901; 437/908
[58] Field of Search ........................... 437/79, 901, 907, 437/908, 918

[56] References Cited

U.S. PATENT DOCUMENTS

| | | | |
|---|---|---|---|
| 3,938,175 | 2/1976 | Jaffee et al. | 437/901 |
| 4,003,127 | 1/1977 | Jaffee et al. | 437/901 |
| 4,229,502 | 10/1980 | Wu et al. | 437/908 |
| 4,267,011 | 5/1981 | Shibata et al. | 437/908 |
| 4,407,060 | 10/1983 | Sakurai | 437/109 |
| 4,514,895 | 5/1985 | Nishimura | 437/908 |
| 4,575,925 | 3/1986 | Kanbara et al. | 437/908 |
| 4,579,600 | 4/1986 | Shah et al. | 437/47 |
| 4,657,775 | 4/1987 | Shioiri et al. | 427/578 |
| 4,727,044 | 2/1988 | Yamazaki | 437/46 |
| 4,803,528 | 2/1989 | Pankove | 257/410 |
| 5,095,401 | 3/1992 | Zavracky et al. | 437/51 |
| 5,242,863 | 9/1993 | Xiang-Zheng et al. | 437/901 |

OTHER PUBLICATIONS

H. Matsumura, et al.; "A Heat–Resisting New Amorphous Silicon"; Appl. Phys. Lett. 36(6); Mar. 15, 1980.
B. Y. Tong, et al.; "Highly Stable, Photosensitive Evaporated Amorphous Silicon Films"; Appl. Phys. Lett. vol. 38, No. 10; May 15, 1981.
J. Binder, et al,; "Laser–Recrystallized Polysilicon Resistors for Sensing and Integrated Circuits Applications"; Sencors and Actuators, 4; 1983.
E. Luder; "Polycrystalline Silicon–Based Sensors"; Sensors and Actuators, 10; 1986.

*Primary Examiner*—Chandra Chaudhari
*Attorney, Agent, or Firm*—Harold E. Meier

[57] ABSTRACT

Semiconductor piezoresistive sensors are fabricated by a process that includes plasma enhanced chemical vapor deposition and selective laser recrystallization. An insulating dielectric layer is first vapor deposited on a flexible substrate. A layer of highly resistive, doped semiconductor material is then deposited over the insulating layer. Metal contacts for the as yet to be formed piezoresistive sensor are deposited at selected locations on the semiconductor layer. Optionally, a passivating layer is then deposited over the semiconductor layer. Through selective laser annealing, portions of the semiconductor layer between selected metal contacts are recrystallized to a preselected resistance to form piezoresistive sensor elements. The non-annealed portions of the semiconductor layer remain to act as insulators between adjacent formed sensor elements.

11 Claims, 3 Drawing Sheets

5,518,951

METHOD FOR MAKING THIN FILM PIEZORESISTIVE SENSOR

This application is a division of application Ser. No. 08/236,653, now abandoned, filed on Apr. 29, 1994, which is a continuation of application No. 07/749,933, filed on Aug. 26, 1991, both now abandoned.

TECHNICAL FIELD

The present invention relates to semiconductor piezoresistive devices, and in particular to piezoresistive sensors fabricated by a method wherein selected portions of a thin film of doped semiconductor material deposited on an insulated flexible substrate are activated by a laser annealing process.

BACKGROUND OF THE INVENTION

It is well known in the art that semiconductor material such as doped silicon possess piezoresistive characteristics. This simply means that the electrical resistance of the semiconductor material changes when the material is subjected to strains such as bending. By attaching a resistive measuring device to the semiconductor material, the change in resistance, and hence the strain applied strain to the semiconductor material, can be measured. There exist a variety of methods known in the art for fabricating piezoresistive sensors from semiconductor materials.

For example, a single piece of doped silicon may be bonded by means of an adhesive gluing process to one side of a strain receiving member. The strain receiving member is typically a flexible metal sheet, bellows or diaphragm. The opposed side of the strain receiving member is exposed to the media that is being measured causing the member to bend, with the strain measured by measuring the change in resistance of the silicon. The major drawback of this "glued gauge" sensor technology is its susceptibility to output drift. As the sensor ages, the bond between the semiconductor material and the strain receiving member also changes thereby requiring the attached resistive measuring electronics for the gauge to be periodically recalibrated.

To obtain linear response from a piezoresistive sensor, it is well known that the formed pressure responsive resistor should be electrically insulated or isolated from the strain receiving member and its support structure. To fabricate such a device as taught by the prior art, monocrystalline silicon is diffused with impurities of one conductivity type and attached to the strain receiving member. The piezoresistive sensor is then formed by subsequently doping monocrystalline silicon with an opposite conductivity type to form an insulating PN junction. Doped monocrystalline silicon exhibits an acceptable gauge factor and has been found well suited for measuring piezoresistive characteristics.

In U.S. Pat. No. 4,003,127 issued to Jaffe, et al., there is disclosed a piezoresistive semiconductor device wherein the strain receiving member is formed from polycrystalline silicon semiconductor material. The same semiconductor material used for the strain receiving member is then also used to form the piezoresistive sensor itself. As opposed to monocrystalline silicon which exhibits a high gauge factor, polycrystalline silicon has a lower, albeit acceptable, gauge factor. The polycrystalline silicon layer, as deposited, has poor conductivity and therefore functions poorly as a piezoresistive sensor. To form the sensor, a masking/etching (photolithography) step is used to define a pressure responsive resistor area in the semiconductor diaphragm material. Through insitu doping, diffusion or ion implantation, followed by activation, the resistor area becomes a piezoresistive sensor. While the fabrication process of Jaffe solves the problems experienced with glued sensors, the strain receiving member formed from the semiconductor material is either exposed directly to the media to be measured, or isolated by means of a secondary diaphragm as will be discussed below.

While the Jaffe, et al. patent discloses and discusses polycrystalline silicon piezoresistive sensors having semiconductor diaphragms, the polycrystalline silicon piezoresistive process disclosed is adaptable for use with strain receiving members of other material types, such as metal. In U.S. Pat. No. 4,657,775 issued to Shioiri, et al., a method for depositing piezoresistive doped polycrystalline films on metal diaphragms utilizing a plasma enhanced chemical vapor deposition (PECVD) process is disclosed. The doped polycrystalline silicon, as deposited, is highly resistive and therefore possesses poor piezoresistive qualities.

To produce piezoresistive measuring devices from the deposited doped polycrystalline silicon on metal layer, photolithography steps are used. For piezoresistive sensors formed by the Shioiri, et al. process, only the area of polycrystalline silicon film on the diaphragm forming the actual gauge pattern is required. Through masking and etching, the gauge pattern is formed and unnecessary semiconductor material removed. After activation of the piezoresistive sensor, a set of metal contacts are applied to the Jaffe, et al. and Shioiri, et al. sensors to enable connection of the electronic resistive measuring circuitry.

The piezoresistive sensor fabrication techniques disclosed by the Jaffe, et al. and Shioiri, et al. patents leave room for improvement. For example, the use of a semiconductor diaphragm, as taught by Jaffe, et al., is undesirable as the sensor cannot be used to measure certain media, for example, corrosives such as acid, that are incompatible with semiconductor material. In addition, the photolithography process utilized by both Jaffe and Shioiri to form the gauge pattern in the deposited polycrystalline silicon material adds to the fabrication cost of individual piezoresistive sensors. Furthermore, the addition of metal sensor contacts after sensor fabrication tends to adversely affect manufacturing costs and increases the number of defective sensors. Accordingly, there is a need for an improved and less expensive method for high volume fabrication of thin film piezoresistive semiconductor sensors exhibiting close design tolerances.

SUMMARY OF THE INVENTION

The foregoing difficulties and problems with the prior art methods for fabricating piezoresistive sensors are addressed by the method of the present invention to form thin film semiconductor piezoresistive sensors. A strain receiving member in the form of a substrate of a chosen material functions as a diaphragm that flexes in response to changes in the media to be measured. In the preferred embodiment of the invention, the substrate is a flexible diaphragm the displacement of which is measured through a piezoresistive sensor on the diaphragm to provide an indication of pressure change, weight change, etc.

Using a deposition process, nonconductive semiconductor layers are deposited to a cleaned surface of the diaphragm. Use of deposition technology accurately and consistently controls the desired thickness of all deposited layers thereby allowing for mass production of sensors exhibiting consistent design tolerances. First, a thin dielectric insulating base layer of silicon nitride is vapor deposited on the cleaned diaphragm surface. Second, a silicon oxide layer is vapor deposited over the silicon nitride layer. The silicon oxide layer has good dielectric qualities that are compatible with an overlying piezoresistive sensor as yet to be deposited and formed. The first two deposited layers isolate the piezoresistive sensor from the conductive metal diaphragm. Third, a layer of doped amorphous/polycrystalline silicon, utilized to form the piezoresistive sensors through a defining process as will be described, is vapor deposited over the silicon oxide layer. As deposited, the polycrystalline film is highly resistive with low piezoresistive qualities.

The metal contacts for connection between the resistive measuring electronics and the yet to be defined piezoresistive sensors are then placed at selected locations on the polycrystalline silicon film using either a sputtering or evaporation system. A shadow mask pattern for the contact location is placed over the polycrystalline layer to allow conductive metal to be deposited at the proper contact locations. Prior art piezoresistive sensor fabrication applied the metal sensor contacts after, rather than before, as in the present invention, defining the piezoresistive sensors. An optional layer of silicon oxide may be deposited over the polycrystalline layer through a second shadow mask. The passivation layer protects the as yet to be defined piezoresistive sensor from damage during subsequent processing. The passivation layer also seals out any impurities that may corrupt the sensor and affect performance.

After all necessary layers are deposited on the metal diaphragm, the nonconductive polycrystalline silicon layer is activated in selected locations to form the piezoresistive sensor. A laser is used to activate the doping atoms present in the polycrystalline layer into activation and conduction. The operating criteria for the laser requires that the output light be at a frequency such that the energy is absorbed by the polycrystalline layer. This causes the polycrystalline layer, between selected metal contacts, to heat, anneal and recrystallize thereby activating the doping atoms into conductivity to form the piezoresistive sensors.

Unlike the prior art processes, there is no need for costly photolithography steps to form the sensor gauge. The non-recrystallized polycrystalline silicon that was not affected by the laser annealing need not be removed and advantageously functions as an insulator between adjacent sensors. Furthermore, by placing the contacts prior to gauge formation, an electrical resistive measuring device may be attached to the contacts to monitor resistivity of the amorphous/polycrystalline film layer as the gauge is being formed by the laser annealing process. Monitoring of resistivity provides electrical feedback that may be used to adjust the laser and control the annealing process.

BRIEF DESCRIPTION OF THE DRAWINGS

A more complete understanding of the method and apparatus of the present invention may be had by reference to the following Detailed Description when taken in conjunction with the accompanying Drawings wherein.

DETAILED DESCRIPTION OF THE DRAWINGS

For ease of description, the method of manufacturing thin film piezoresistive sensors of the present invention will be described in connection with the preparation of only one such sensor. It will, however, be understood that the method of the present invention may be advantageously utilized to simultaneously manufacture many sensors through use of well known semiconductor wafer manufacturing technology along with the method of the present invention. Furthermore, although the preferred embodiment of the present invention discloses sensor fabrication with silicon based semiconductor materials, it will be understood that the sensor may be formed from any other semiconductor type materials, for example, germanium, exhibiting similar properties.

Figure 4:
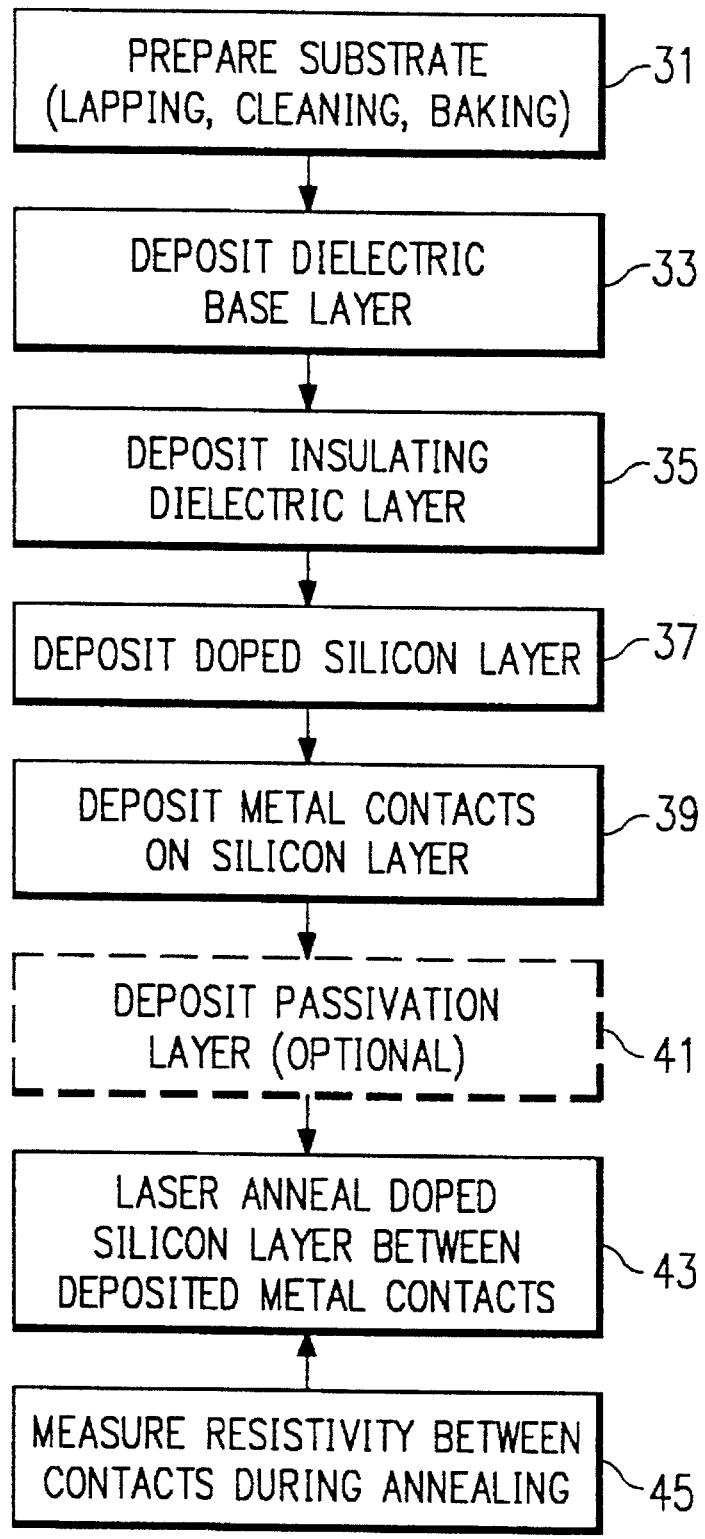
FIG. 4 shows a flow diagram for the fabrication process for the thin film piezoresistive sensors as shown in FIGS. 1A to 1I.

Reference is now made to FIGS. 1A to 1I and FIG. 4 for an explanation of the manufacturing method utilized to fabricate thin film piezoresistive sensors. In FIGS. 1A to 1I, there is shown, in a series of schematic cross-sectional views, a thin film piezoresistive sensor at different manufacturing steps according to the fabrication method of the present invention. In FIG. 4, there is shown a flow diagram, corresponding to the manufacturing steps as shown in FIGS. 1A to 1I.

Figure 1A:
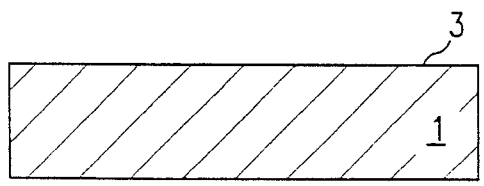
FIGS. 1A to 1I show partial schematic cross-sectional views of a thin film piezoresistive sensor during different steps of the fabrication method in accordance with the preferred embodiment of the present invention wherein the size of the film layers are shown in an exaggerated manner.
Figure 2:
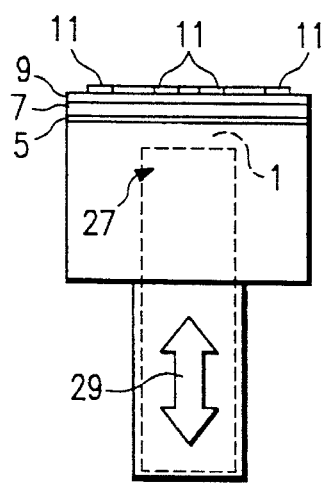
FIG. 2 shows a side view of a pressure sensing application of a thin film piezoresistive sensor fabricated according to the method of the present invention wherein the size of the film layers are shown in an exaggerated manner.

A strain receiving member in the form of a substrate 1 of a chosen material provides the support for the sensor of the present invention. The substrate 1 as shown in FIG. 1A is preferably formed of a flexible metal substance (for example, stainless steel), but also may be formed from any other chosen material provided the material flexes in response to changes in, and is compatible with the media the sensor is designed to measure. For example, in a pressure sensor application as shown in FIG. 2, the stainless steel substrate 1 covers an aperture 27 to provide a pressure diaphragm flexing in response to pressure changes in the fluid flow 29. It should be understood that a sensor fabricated by the process of the present invention also finds utility in many force measurement applications, such as, decelerometers, torque sensor and load cells.

In the first manufacturing step of the method of the present invention, as shown in FIG. 1A and FIG. 4 at flow step 31, the top surface 3 of the substrate 1 is prepared for reception of all subsequently deposited silicon based layers. The top surface 3 of the substrate 1 is first lapped to a smooth finish to promote bonding of the first silicon layer. After lapping, the substrate 1 is cleaned by washing the lapping compounds and fluids therefrom. Finally, the substrate 1 is baked in a dehydration chamber to remove any rinse water or moisture remaining from the cleaning process.

Figure 1B:
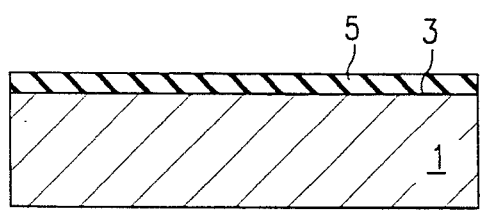

Next, as shown in FIG. 1B and FIG. 4 at flow step 33, a nonconductive silicon nitride ($Si_3N_4$) layer 5 is deposited on the top surface 3 of the substrate 1. The silicon nitride layer 5 functions as an insulating or dielectric base layer for the sensor. In the preferred embodiment, silicon nitride is chosen because its thermal coefficient of expansion and intrinsic stress as deposited promote adhesion of the subsequently deposited silicon based films. Of course, as will be understood, any other insulating dielectric layer having similar qualities may be substituted for the silicon nitride layer 5.

The preferred method for deposition of the silicon based layers in the manufacturing method of the present invention is by plasma enhanced chemical vapor deposition (PECVD). This deposition process takes advantage of thermal decomposition due to plasma enhancement to deposit thin films of semiconductor material in a controlled manner. As the operation of a PECVD chamber is well known in the art, and a detailed description of its operation does not form a part of the present invention, further description is deemed unnecessary.

The parameters of the PECVD deposition method, however, can be varied according to the desired properties, uses and configuration of the formed device. Thus, for purposes of illustration only, and not for limitation, the PECVD parameters for each step of the method of the present invention will be provided as a specific example of the practice. Furthermore, it will be understood that any other process compatible with the diaphragm material and suitable for depositing semiconductor material may be substituted for the PECVD process utilized for the preferred embodiment.

To deposit a silicon nitride layer 5 having a thickness of about 0.5 microns utilizing the preferred PECVD process, silane ($SiH_4$) at a flow rate of 10 SCCM ($cm^3$/min. at 1 atm. at 20° C.) and ammonia at a flow rate of 100 SCCM are introduced into the PECVD chamber. The chamber is set at a temperature of 300° C. and a pressure of 360 millitorr. Applied plasma energy at 23 watts with a frequency of 13.5 megahertz for a time of approximately 50 minutes causes the silicon nitride layer 5 to deposit on the substrate 1.

Figure 1C:
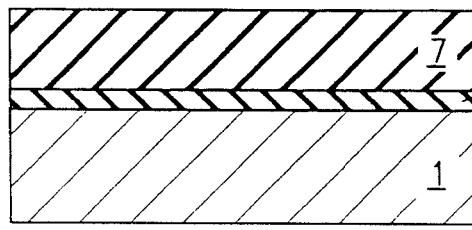

Next, as shown in FIG. 1C and FIG. 4 at step 35, a silicon dioxide ($SiO_2$) layer 7 is vapor deposited over the silicon nitride layer 5. A silicon dioxide layer 7 is used for the sensor of the present invention because it has a relatively rapid deposition rate and is a good dielectric that complements the overlying semiconductor layer yet to be deposited. The silicon dioxide layer 7 acts as an insulating dielectric in conjunction with, and in addition to the silicon nitride layer 5.

The silicon dioxide layer 7 is vapor deposited with the same PECVD apparatus as the silicon nitride layer 5. The silicon nitride step (FIG. 1B) and the silicon dioxide step (FIG. 1C) are sequential, requiring only parameter changes for the PECVD apparatus. To deposit a silicon dioxide layer 7 having a thickness of about 6.0 microns utilizing the preferred PECVD process, silane at a flow rate of 10 SCCM and nitrous oxide ($N_2O$) at a flow rate of 110 SCCM are introduced into the PECVD chamber. The chamber is set at a temperature of 300° C. and a pressure of 200 millitorr. Applied plasma energy at 23 watts with a frequency of 13.5 megahertz for a time of approximately 90 minutes causes the silicon dioxide layer 7 to deposit on the silicon nitride layer 5.

Figure 1D:
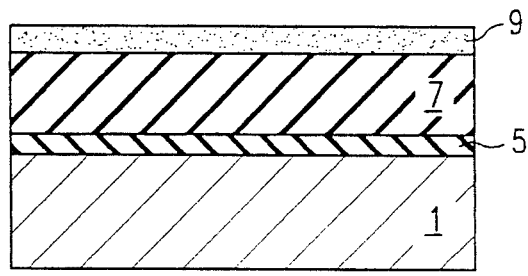

Following the above steps, as shown in FIG. 1D and FIG. 4 at step 37, a doped amorphous/polycrystalline silicon layer 9 is vapor deposited over the silicon dioxide layer 7. Portions of the polycrystalline silicon layer 9 will eventually be formed into a piezoresistive sensor gauge according to a process step yet to be described. As deposited, however, the amorphous/polycrystalline silicon layer 9 is highly resistive exhibiting poor piezoresistive qualities and is similar to the deposited dielectric silicon nitride layer 5 and silicon dioxide layer 7. In the preferred embodiment, the amorphous/polycrystalline silicon layer 9 is doped with boron. It will, of course, be understood however, that the amorphous/polycrystalline layer 9 may be comprised of any other doped semiconductor material.

The boron doped amorphous/polycrystalline silicon layer 9 is vapor deposited with a PECVD apparatus similar to the PECVD apparatus used for depositing the silicon nitride layer 5 and silicon dioxide layer 7. The silicon nitride step (FIG. 1B), the silicon dioxide step (FIG. 1C) and the polycrystalline silicon step (FIG. 1D) are sequential. To deposit a boron doped amorphous/polycrystalline silicon layer 9 having a thickness of about 0.5 microns utilizing a preferred PECVD process, silane at a flow rate of 5 SCCM and diborane ($B_2H_6$) at a flow rate of 9 SCCM are introduced into the PECVD chamber. The chamber is set at a temperature of 640° C. and a pressure of 55 millitorr. Applied plasma energy at 23 watts with a frequency of 13.5 megahertz for a time of approximately 60 minutes causes the doped polycrystalline silicon layer 9 to deposit on the silicon dioxide layer 7.

Figure 1E:
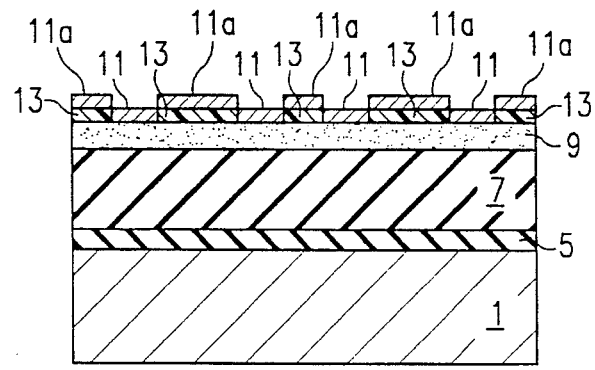
Figure 1F:
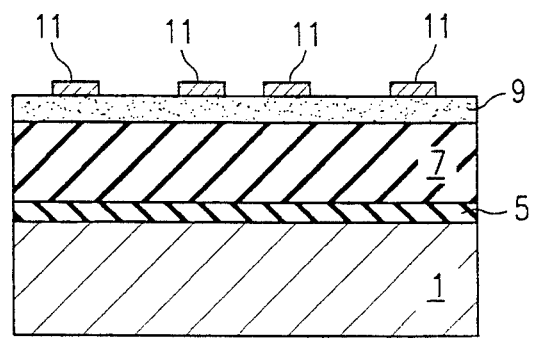

Although not yet defined in the deposited polycrystalline silicon layer 9, a piezoresistive sensor gauge requires metal contacts to enable coupling of the resistive measuring electronics to the gauge. Accordingly, metal contacts 11 are deposited over the polycrystalline silicon layer 9 at selected locations as shown in FIGS. 1E and 1F and FIG. 4 at step 39. A shadow mask pattern 13 for the contact locations is placed over the polycrystalline silicon layer 9 to allow conductive metal contacts 11 to be deposited at the proper contact locations. Unwanted metal 11a is prevented from being deposited by the shadow mask pattern 13. The contacts 11 are formed of an aluminum/1% silicon mixture and are deposited to a thickness of about 1.0 microns. The aluminum/silicon mixture advantageously forms a stable contact with the silicon layer 9 through a self-alloying process by means of the annealing step in the process as will be described.

Prior art piezoresistive sensor fabrication applied the metal sensor contacts after, not before, defining the piezoresistive sensors. One drawback of the prior art process where contacts are applied after the gauge formation is that requires a mask alignment step, thus complicating the fabrication process. Creating the piezoresistive sensor after contact 11 deposition requires no alignment to a previously defined pattern because the gauge and contacts are self aligning. An important advantage resulting from the depositing of metal contacts prior to sensor formation is that a probe can be attached to the metal contacts 11 to measure resistance of a sensor gauge as it is formed by the annealing process to be described, thereby enabling a more carefully controlled gauge formation process.

Figure 1G:
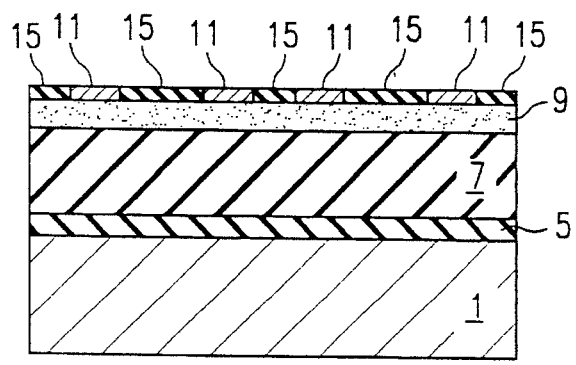
Figure 1H:
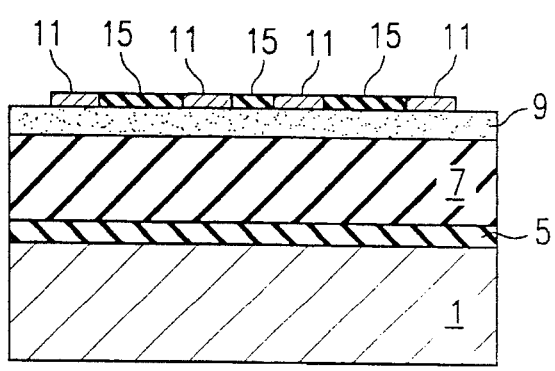

Following the preceding steps, as shown in FIGS. 1G and 1H and FIG. 4 at step 41, a silicon dioxide passivation layer 15 may be vapor deposited over the polycrystalline silicon layer 9 and the metal contacts 11. The deposition of a passivation layer 15 is illustrated in FIG. 4 in broken lines as such is optional. A shadow mask pattern 17 for the passivation layer 15 is placed over the polycrystalline silicon layer 9 to allow silicon dioxide to be deposited at the proper locations. For the same reproduction and consistency reasons as with the deposited metal contacts 11, the passivation layer 15 is deposited prior to formation of the piezoresistive sensor. The passivation layer also seals out impurities and contaminants from the silicon surface that may adversely affect performance of the yet to be defined piezoresistive sensor.

The passivation layer 15 is vapor deposited with a PECVD apparatus similar to that used for the silicon nitride layer 5 and silicon dioxide layer 7. To deposit the passivation layer 15 having a thickness of about 1.0 microns utilizing a PECVD process, silane at a flow rate of 10 SCCM and nitrous oxide at a flow rate of 110 SCCM are introduced into the PECVD chamber. The chamber is set at a temperature of 300° C. and a pressure of 200 millitorr. Applied plasma energy at 23 watts with a frequency of 13.5 megahertz for a time of approximately 15 minutes causes the silicon dioxide passivation layer 15 to deposit on the polycrystalline silicon layer 9 according to the shadow mask pattern 17.

As mentioned above, the silicon layer 9, as deposited, is highly resistive, exhibiting poor piezoresistive characteristics. It is well known that doped silicon can be activated and made conductive and piezoresistive through an annealing process. Typically, this annealing process is performed in the prior art by a process that utilizes infrared heating. Thereafter, in the prior art the actual sensor is defined by a photo masking process and any excess polycrystalline silicon is removed through etching. This process is commonly referred to as photolithography and etch and tends to add complexity to the process with a corresponding increase in the production cost of the sensor.

Figure 1I:
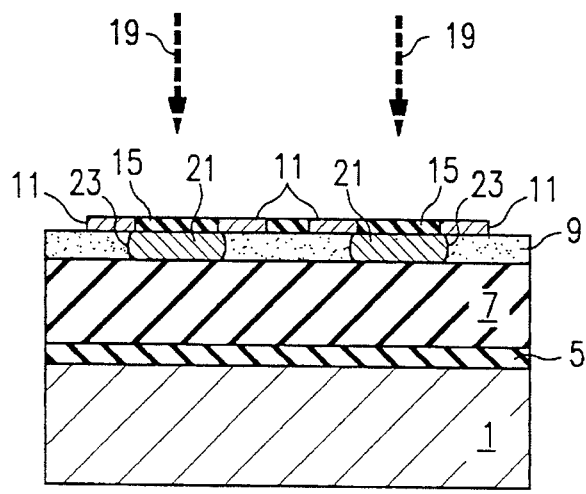

Next, as shown in FIG. 1I and FIG. 4 at step 43, a piezoresistive sensor is formed in the boron doped amorphous/polycrystalline silicon layer 9 according to the method of the present invention. To anneal the amorphous/polycrystalline silicon layer, laser beam 19, from for example a YAG laser or an argon laser, is used to trace individual piezoresistive sensor gauges 21 at specific locations in the polycrystalline silicon layer 9. The laser beam 19 is directed to repeatedly pass over the layer 9 between selected metal contacts 11 to heat the polycrystalline layer 9. The heat generated by the annealing step penetrates a short distance under the contacts 11 and bonds (self-alloys) with the aluminum/silicon mixture of the contacts as shown at 23. As can be seen in FIG. 1I, the areas of the polycrystalline silicon layer 9 not affected by the laser annealing process that traces the sensor gauges 21 remain and act as an insulator between adjacent gauges 21.

The operating conditions, e.g., energy power and time applied to the layer 9, of the laser must be selected such that the laser energy will be absorbed by and anneal the polycrystalline silicon layer 9 to perform the annealing process. This control is achieved by a probe attached to the already deposited contacts 11, the resistance of the area of the layer 9 subject to the laser energy is monitored and fed back to the laser control. When the desired gauge resistance is attained, the laser 19 is turned off. This feedback control provides the advantage of consistency between fabricated gauges that has not been available in prior art fabrication methods.

Figure 3:
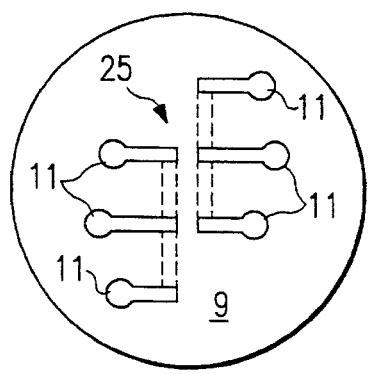
FIG. 3 shows a schematic top view of a piezoresistive sensor having a Wheatstone Bridge circuit defined thereon according to the method of the present invention.

Referring now to FIG. 3, a Wheatstone Bridge circuit 25 having four resistors is shown, in broken lines, defined in the amorphous polycrystalline silicon layer 9. Each included resistor in the circuit 25 acts as a piezoresistive sensor element. Metal contacts 11 enable electronic resistive measuring equipment to be coupled to the circuit 25. Furthermore, as previously explained and illustrated as step 45 in FIG. 4, electronic resistive devices may be coupled to the contacts during annealing to measure the resistivity of a formed gauge for quality control and improved reliability.

The parts of the polycrystalline silicon layer 9 that are untouched by the laser beam defining the circuit 25 remain essentially highly resistive and act in conjunction with the underlying silicon nitride and silicon dioxide layers as insulators between the resistors and the diaphragm and between individual adjacent resistors. Thus, expensive photolithography steps are not required to remove areas of the polycrystalline layer as in the prior art. Even though a Wheatstone Bridge sensor circuit 25 has been disclosed, it will be understood that the method of the present invention may be utilized to define any type piezoresistive sensor element or circuit design in the polycrystalline layer.

Although a preferred embodiment of the method and apparatus of the present invention has been illustrated in the accompanying Drawings and described in the foregoing Detailed Description, it will be understood that the invention is not limited to the embodiment disclosed but is capable of numerous modifications without departing from the scope of the invention.

We claim:

1. A method for making piezoresistive semiconductor sensor gauges comprising the steps of:

preparing at least a first surface of a substrate having two opposed surfaces;

depositing a dielectric insulating layer on the first surface of the substrate;

depositing a doped semiconductor layer on top of the dielectric insulating layer, said semiconductor layer having a high resistivity as deposited;

applying electrical contacts at locations on the semiconductor layer; and annealing the semiconductor layer between selected electrical contacts to lower the resistivity of the semiconductor layer and define therein one or more sensor gauges comprised of annealed semiconductor material.

2. The method for making piezoresistive sensor gauges as in claim 1 wherein the step of preparing a substrate further comprises the steps of lapping, washing and drying the first surface.

3. The method for making piezoresistive sensor gauges as in claim 1 wherein the step of depositing a dielectric insulating layer comprises the steps of:

vapor depositing through a plasma enhanced chemical vapor deposition process a layer of silicon nitride having a thickness of about 0.5 microns; and vapor depositing through a plasma enhanced chemical vapor deposition process a layer of silicon dioxide having a thickness of about 7.0 microns.

4. The method for making piezoresistive sensor gauges as in claim 1 wherein the step of applying electrical contacts at locations on the semiconductor layer comprises the steps of:

forming a mask layer over the semiconductor layer, said mask defining the locations of each electrical contact; and depositing metal contacts of a silicon/aluminum mixture to the semiconductor layer according to the mask.

5. The method for making piezoresistive sensor gauges as in claim 1 including the step of depositing a passivation layer on top of the semiconductor layer wherein the passivation layer is deposited by the steps of:

forming a mask layer defining the locations for passivation over the doped semiconductor layer;

vapor depositing through a plasma enhanced chemical vapor deposition process a layer of silicon dioxide having a thickness of about 1.0 micron.

6. The method for making piezoresistive sensor gauges as in claim 1 wherein the step of depositing a doped semiconductor layer on top of the dielectric insulating layer comprises the step of vapor depositing through a plasma enhanced chemical vapor deposition process a layer of amorphous/polycrystalline silicon doped with boron, where the layer has a thickness of about 0.5 microns.

7. The method for making piezoresistive sensor gauges as in claim 1 wherein the step of annealing portions of the semiconductor layer comprises the step of irradiating said portions with a laser beam to anneal the semiconductor layer into conductivity and trace out sensor gauges.

8. The method for making piezoresistive sensor gauges as in claim 1 further comprising the step of measuring the resistivity of the semiconductor layer between selected contacts during the annealing step to monitor the resistivity of the sensor gauge.

9. A method for making piezoresistive semiconductor sensor gauges comprising the steps of:

preparing at least a first surface of a flexible substrate having two opposed surfaces, the first of said surfaces having been lapped, cleaned and dried;

vapor depositing through a plasma enhanced chemical vapor deposition (PECVD) process a layer of silicon nitride;

vapor depositing through a PECVD process a layer of silicon dioxide:

vapor depositing through a PECVD process a highly resistive layer of doped amorphous/polycrystalline silicon;

applying electrical contacts on the doped silicon layer by:
      forming a first mask layer defining locations of each electrical contact on the doped silicon layer;
      depositing a metal to the doped silicon layer according to the mask layer; and
      removing the first mask layer from the doped silicon layer; and annealing portions of the doped silicon layer between selected electrical contacts by irradiating said portions with a laser beam to recrystallize the layer and activate the doping atoms present to lower the resistance of the doped silicon layer, said laser beam tracing out one or more piezoresistive sensor gauges according to a pattern, the non-annealed portions of the doped silicon layer acting as insulators between adjacently traced sensor gauges.

10. The method for making piezoresistive semiconductor sensor gauges as in claim 9 wherein the silicon nitride layer has a thickness of about 0.5 microns, the silicon dioxide layer has a thickness of about 7.0 microns, and the doped amorphous/polycrystalline silicon layer has a thickness of about 0.5 microns.

11. The method for making piezoresistive semiconductor sensor gauges as in claim 9 further comprising the step of depositing a passivation layer on top of the doped silicon layer by:

forming a second mask layer defining the locations for passivation over the doped silicon layer;

vapor depositing through a PECVD process a layer of silicon dioxide; and removing the second mask layer from the doped silicon layer.

* * * * *